(12) United States Patent
DeWald (10) Patent No.: US 9,539,552 B2
(45) Date of Patent: Jan. 10, 2017

(54) DEVICE FOR ENHANCING THE MOBILITY OF A STANDARD MIXER

(71) Applicant: Rex DeWald, Dallas, TX (US)

(72) Inventor: Rex DeWald, Dallas, TX (US)

( * ) Notice: Subject to any disclaimer, the term of this patent is extended or adjusted under 35 U.S.C. 154(b) by 518 days.

(21) Appl. No.: 14/201,741

(22) Filed: Mar. 7, 2014

(65) Prior Publication Data

US 2014/0254306 A1    Sep. 11, 2014

Related U.S. Application Data

(60) Provisional application No. 61/775,310, filed on Mar. 8, 2013.

(51) Int. Cl.
*B01F 15/00* (2006.01)
*F16M 11/42* (2006.01)
*B60B 33/00* (2006.01)
*B60B 33/08* (2006.01)

(52) U.S. Cl.
CPC ..... *B01F 15/00772* (2013.01); *B60B 33/0063* (2013.01); *B60B 33/08* (2013.01); *F16M 11/42* (2013.01)

(58) Field of Classification Search
CPC ............ B01F 15/00772; B60B 33/063; B60B 33/066; F16M 11/42; A47J 47/16
USPC ......................................... 366/349
See application file for complete search history.

(56) References Cited

U.S. PATENT DOCUMENTS

| | | |
|---|---|---|
| 2,803,510 A | 8/1957 | Carbary |
| 3,673,592 A | 6/1972 | Berry et al. |
| 4,417,738 A | 11/1983 | Kendall |
| 5,971,408 A | 10/1999 | Mandel et al. |
| 7,219,865 B2 | 5/2007 | Davis et al. |

(Continued)

FOREIGN PATENT DOCUMENTS

| | | | | |
|---|---|---|---|---|
| AU | WO 2012/126051 A1 | 9/2012 | | |
| EP | 2500183 A1 * | 3/2012 | ............ | B60B 33/06 |

(Continued)

OTHER PUBLICATIONS

Bed Bath & Beyond, Copco Coffee Cab Small Appliance Slider, internet advertisement, www.bedbathandbeyond.com/product.asp?SKU=18490129.

(Continued)

*Primary Examiner* — Charles Cooley
*Assistant Examiner* — Marc C Howell
(74) *Attorney, Agent, or Firm* — Gagnon, Peacock & Vereeke P.C.; Aaron P. Peacock (57) ABSTRACT

A device for enhancing the mobility of a standard mixer, the device including a housing attached to a mixer, the housing having at least one shoulder attached thereto, the at least one shoulder having at least one nodule jutting out therefrom, a lever pivotally connected to the housing, a rod pivotally connected to the lever, a plate mounted to the rod, the plate having at least one finger that protrudes therefrom and a retractable member having at least one transfer ball attached thereto for rolling on a surface, the retractable member slidably engaged to the at least one finger, the retractable member having at least one groove thereon for fitting the at least one finger therein, the at least one groove having at least one bar fitted therein for permitting the first side of the at least one finger to slide over the at least one bar.

12 Claims, 13 Drawing Sheets

(56) References Cited

U.S. PATENT DOCUMENTS

2009/0207690 A1* 8/2009 Curtis ............... B01F 9/0001
366/198
2015/0375185 A1* 12/2015 Waizenauer ........ B01F 15/0251
366/151.1

FOREIGN PATENT DOCUMENTS

| FR | 2604426 A1 * | 4/1988 | ............ B60B 33/06 |
| GB | 1027671 | 4/1966 | |
| GB | 2422304 A | 7/2006 | |

OTHER PUBLICATIONS amazon.com, Smart TV Solutions Easy Butler Kitchen Counter Top Appliance Sliding Back, Black, internet advertisement.
The Gold Standard Powermatic, 1792000K: PM2000, 3HP 1PH Table Saw, with 50" Accu-Fence System, advertisement.
Improvements, Rolling Appliance Caddy—Set of 2, internet advertisement.
PHKFM, VMI PH610 Planetary Mixer, internet advertisement, www.hkfm.com.hk/product.php?id=40.

* cited by examiner

DEVICE FOR ENHANCING THE MOBILITY OF A STANDARD MIXER

CROSS-REFERENCE TO RELATED APPLICATIONS

Applicant claims priority to U.S. Provisional Patent Application No. 61/775,310, filed Mar. 8, 2013, the disclosure of which is incorporated by reference herein in its entirety.

BACKGROUND OF THE INVENTION

A standard mixer is a staple in the kitchen of homes and businesses around the world. Because of its utilitarian aspect especially in food applications, typically a mixer is used in or around the area of a kitchen and, when not in use, stored in various places, such as on a kitchen countertop, in a kitchen cabinet, within an appliance garage or other similar compartment or storage unit. Therefore, generally after the mixer has been used, it is moved to a separate location for storage purposes. Once it is needed again, it is repositioned to the proper area of the kitchen for reuse.

Mixers exist in varying shapes, sizes and weights. Most mixers, however, are substantial in size and are heavy; some weigh in excess of twenty-five (25) pounds. They tend to comprise a plethora of structural as well as electrical and mechanical components, thus contributing to their considerable weight. Also, because mixers comprise internal parts that move and/or rotate when in operation, they are designed and manufactured to remain stationary while in use. Therefore, because of their considerable weight and because of the manner in which they are designed, typically mixers are inert to movement. They are designed to sit upright on a surface and to resist forces which displace them, such as forces that would cause them to slide on a surface such as a countertop. Consequently, intentionally repositioning and/or moving a mixer along a surface entails picking the mixer up vertically from the surface, moving it to the desired location and then setting it down. Therefore, the intentional moving, displacing and/or repositioning of mixers can be a daunting task particularly if they are cumbersome and heavy.

Occasionally, a mixer is stored on a countertop surface and moved from one countertop location to another countertop location for use. Unfortunately, moving the mixer from one location to another on the same surface requires a user to pick up the mixer vertically and place it at the desired spot. Because the mixer is not designed to slide on a surface as previously mentioned, the mixer must be removed from the surface by the user, such as by picking it up so that it is disengaged from the surface, suspended in mid air, moved to the desired location and then placed back onto the surface. Additionally, for cleaning purposes, a mixer may be relocated to an area next to the sink. Again, in doing so; the mixer cannot be slid or rolled along the surface.

Due to a mixer's considerable size and weight, users may find it difficult to lift. For some users, lifting a mixer may exacerbate back or neck problems and/or cause bodily pain. For others, a mixer may weigh too much to lift without the aid and assistance of others. Moreover, lifting and carrying a mixer expends additional time and considerable effort for the user. Also, it increases that chances that the mixer could be damaged due to falling accidently out of the user's hands while the vertical lift is in progress.

What is needed is a device that, when prompted (activated), permits a standard mixer to be moved from one location on a surface to another location on the surface without removing the mixer vertically from the surface, thereby permitting the mixer to be repositioned with a minimum amount of time and effort. More specifically, what is needed is a device that, when prompted, permits a standard mixer to roll easily on a surface until it is repositioned to the desired location.

A device that attaches to a standard mixer which, when prompted (activated), permits the mixer and the attached device to roll easily on a surface such as a countertop until repositioned at the desired surface location is a novel invention that meets the needs described in the above paragraphs. Disclosed herein are embodiments of the present invention. However, it should be noted that the invention can comprise additional embodiments not necessarily disclosed in this paper.

An embodiment of the present invention comprises a device which attaches to the bottom (i.e., underside) of a standard mixer. Typically, to prevent any movement such as sliding or rolling, a standard mixer has feet that extend downward from the bottom of the mixer which make contact with a surface or has a flat bottom which contacts the surface. The device can attach to either type of mixer as well as to other types. Similar to the bottom of many standard mixers, the bottom of the device comprises feet that extend downward which can make contact with a surface, thereby preventing the mixer from moving about the surface unless prompted. When prompted, a retractable member having transfer balls attached thereto descends from the bottom of the device. The retractable member descends until the retractable balls make contact with the surface and extend downward lengthwise further than the feet of the device, thereby causing the feet to detach from the surface. Then, the mixer is permitted to roll on the surface and can be positioned to a desired location.

Once the mixer is positioned to the desired location, the device can be prompted again. When prompted again, the retractable member retracts into the device, thereby causing the transfer balls to retract into the device. As the transfer balls retract, they move upward and are detached from the surface. Once the transfer balls retract, the feet of the device contact the surface. Now the mixer is in stationary mode, inhibiting movement about the surface so that it can be used, stored, cleaned, etc.

In one embodiment of the present invention, the prompting can occur through the use of a lever that is positioned on the side of the device. When the lever is pulled/pushed, the retractable member descends/ascends and the tractable balls contact/detach the surface, thus allowing/preventing the mixer from rolling on the surface. In another embodiment of the present invention, the prompting can occur through the use of a switch positioned on or about the device. The switch can comprise three different modes: a mode to cause the retractable member and transfer balls to descend so that the mixer can roll on a surface, a mode to cause the retractable member and transfer balls to retract so that the mixer is stationary and does not roll and a mode that causes no action by the device (i.e., the 'off' position). This embodiment comprises certain electrical components such as, without limitation, an actuator, battery and switch—instead of a lever—to cause the device to operate. A user can adjust the switch so that the device performs the desired function.

DETAILED DESCRIPTION

Figure 1:
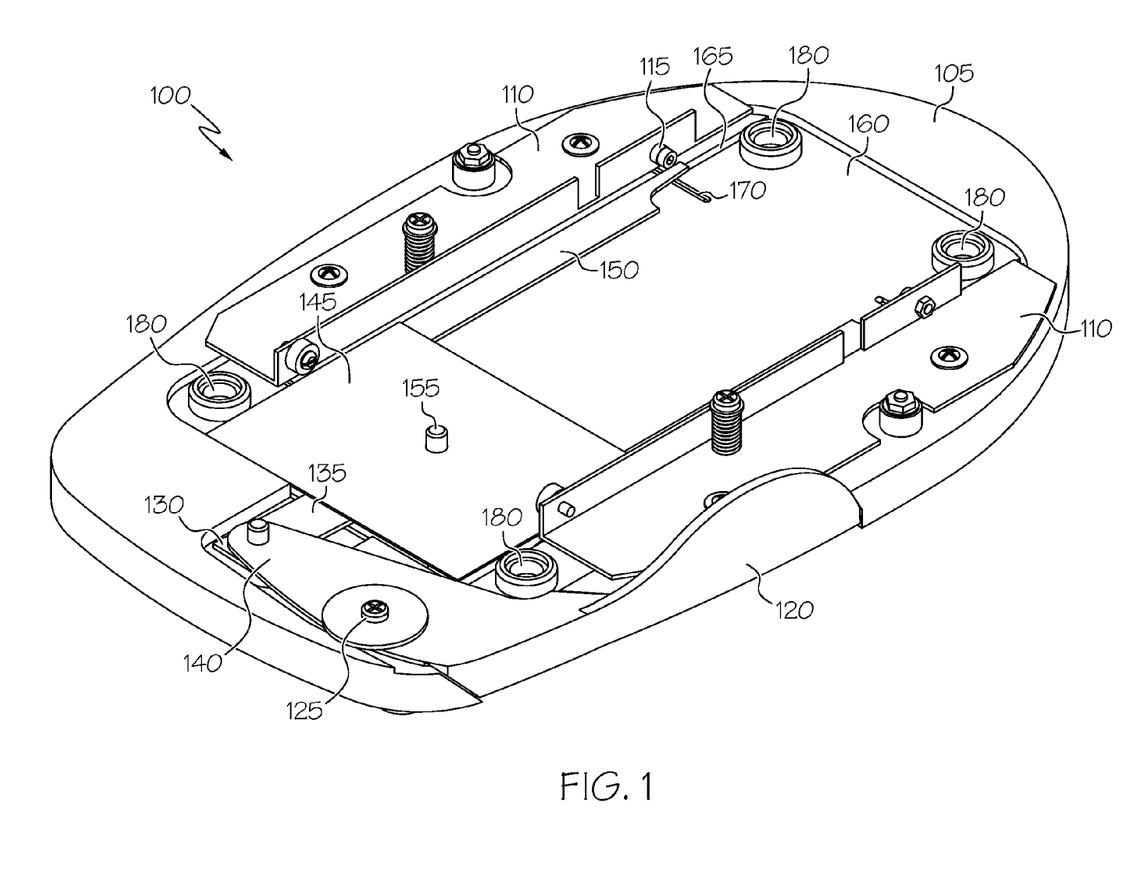
FIG. 1 is a perspective view of the topside of a device for enhancing the mobility of a mixer, comprising an embodiment of the present invention.

While the present invention encompasses numerous embodiments that provide for a device which, when prompted, permits a mixer to roll about a surface and, when prompted again, restrains the mixer from moving about the surface, one particular embodiment involves a device having a lever attached thereto to impart to the device promptings by a user. In this embodiment, the present invention comprises only mechanical components—no electrical or electronic components. As such, no electrical power is needed to cause the present invention to operate. FIG. 1 depicts such an embodiment.

Turning to FIG. 1, an illustration is shown that depicts a device 100 which attaches to the underside of a standard mixer and permits the mixer and the attached device 100 to roll about a surface when prompted and inhibits movement about the surface when prompted again. The portion of the device 100 shown in FIG. 1, which is the topside of the device 100, securely attaches to the underside of a mixer, so that the device 100 and the mixer can be considered one unit.

FIG. 1 depicts a housing 105 having two shoulders 110 attached thereto and a plurality of nodules 115 that jut out from the shoulders 110. A lever 120 pivotally connects to the housing 105 via a fulcrum 125. The proximate portion 130 of a rod 135 pivotally connects to the load portion 140 of the lever 120. A plate 145 having two protruding fingers 150 mounts to a prong 155 that extends upward from the distal portion of the rod 135 and also mounts to a retractable member 160. The retractable member 160 comprises two grooves 165 thereon which slidably engage with the fingers 150 of the plate 145. The retractable member 160 includes a plurality of bars 170 that are positioned thereon.

Figure 2:
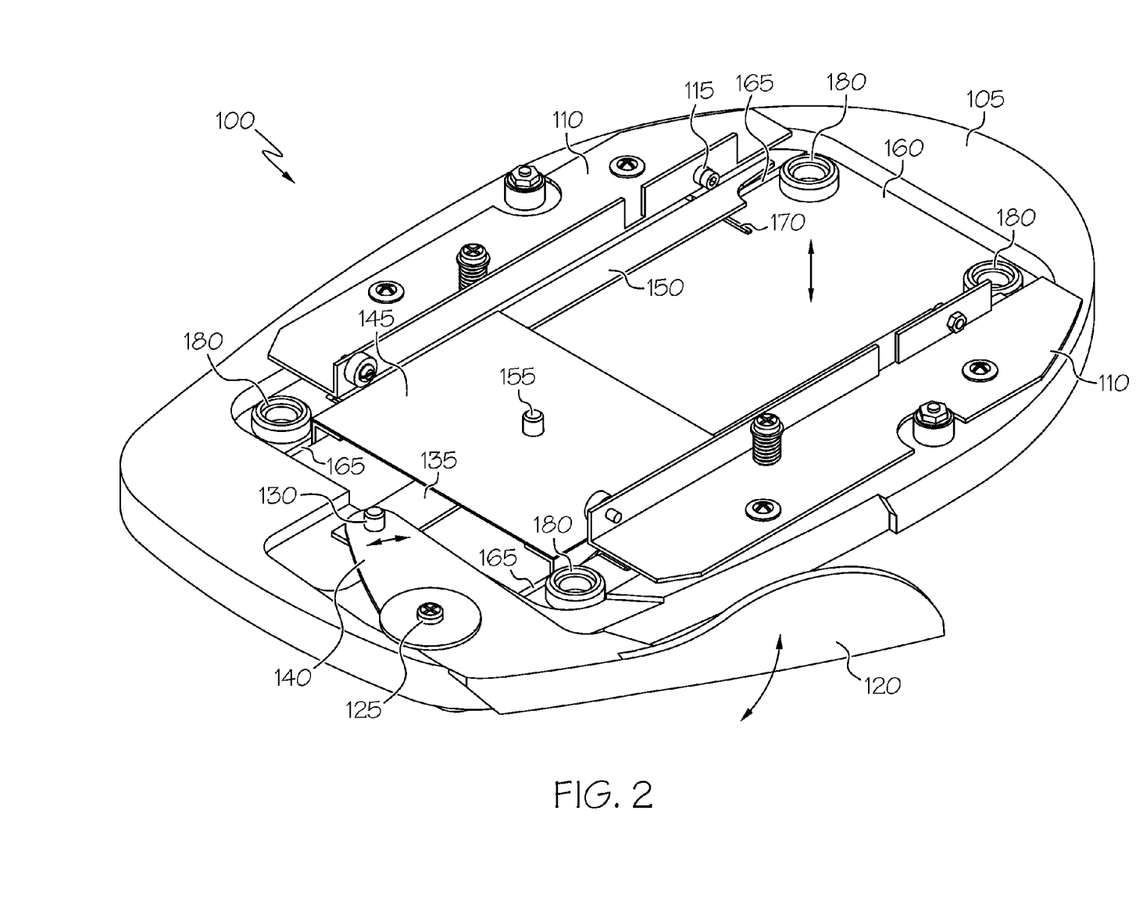
FIG. 2 is the perspective view of the device of FIG. 1 depicting the direction of movement of particular component parts.

As FIG. 2 depicts, when prompted, the lever 120 is pulled in a direction opposite the housing 105, causing the load portion 140 of the lever 120 to move in a forward but slightly circular direction about the fulcrum 125. As the load portion 140 moves, it pushes the rod 135 in a forward direction which, in turn, pushes the plate 145 in a forward direction. As the plate 145 moves forward, the protruding fingers 150 slide forward in the grooves 165 of the retractable member 160. At a predetermined location, the protruding fingers 150 begin to slide over the bars 170 positioned within the retractable member 160. As the protruding fingers 150 slide over the bars 170, the retractable member 160 is forced downward. The downward force results because the nodules 115 restrict the protruding fingers 150 from moving in an upward direction, thus the only other direction for movement is downward. Therefore, as the protruding fingers 150 slide over the bars 170, the retractable member 160 is forced downward. As the protruding fingers 150 continue sliding over the bars 170, the retractable member 160 continues in a downward direction until the transfer balls attached thereto descend further than the length of the feet attached to the housing 105. Once transfer balls descend further than the feet, the transfer balls make contact with the surface, thereby permitting the mixer to roll about the surface.

If, however, the device 100 is mobile, permitting the mixer to roll about a surface uninhibited, but it is desired to return the device 100 to immobility so that the device 100 cannot roll about the surface, then the device 100 can be prompted to return to a stationary mode. When prompted, the lever 120 is pushed in a direction toward the housing 105, causing the load portion 140 of the lever 120 to move in a backward but slightly circular direction about the fulcrum 125. As the load portion 140 moves, it pulls the rod 135 in a backward direction which, in turn, pulls the plate 145 in a backward direction. As the plate 145 moves backward, the protruding fingers 150 slide backward, thus sliding off of the bars 170. As the protruding fingers 150 slides off of the bars 170, the retractable member 160 moves in an upward direction. As the retracted member 160 retracts into the housing 105, the transfer balls attached to the retractable member 160 retract also. Thus, the transfer balls disengage the surface, thereby causing the feet to make contact with the surface. In so doing, the mixer becomes stationary and resistant to mobility about the surface.

Figure 3:
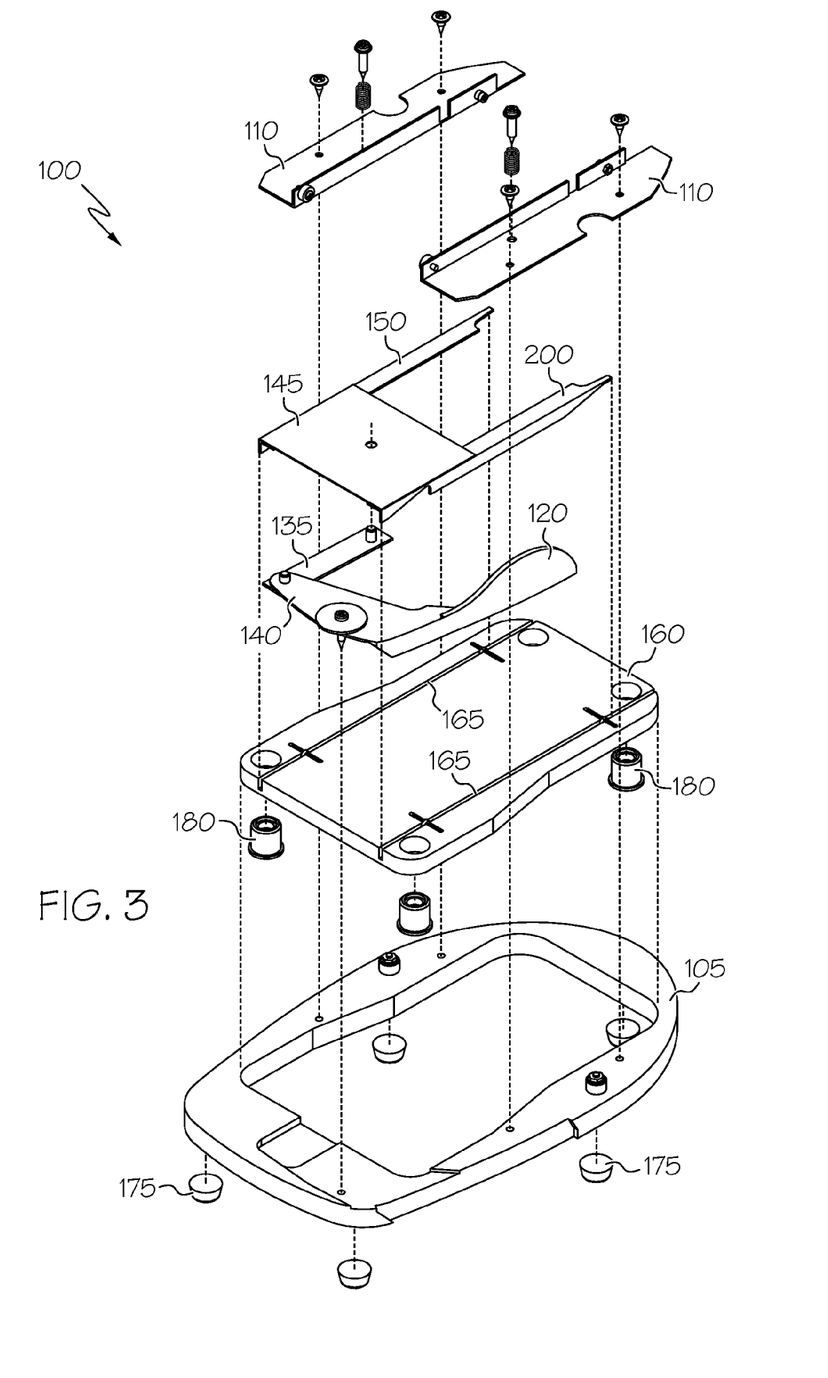
FIG. 3 is an exploded view of the device of FIG. 1.

FIG. 3 depicts an exploded view of the device 100. As shown, the device 100 comprises the housing 105 having feet 175 attach thereto and that protrude therefrom, a retractable member 160 having transfer balls 180 attached thereto, a lever 120, a plate 145 having protruding fingers 150 and shoulders 110 attached to the housing 105.

Figure 4:
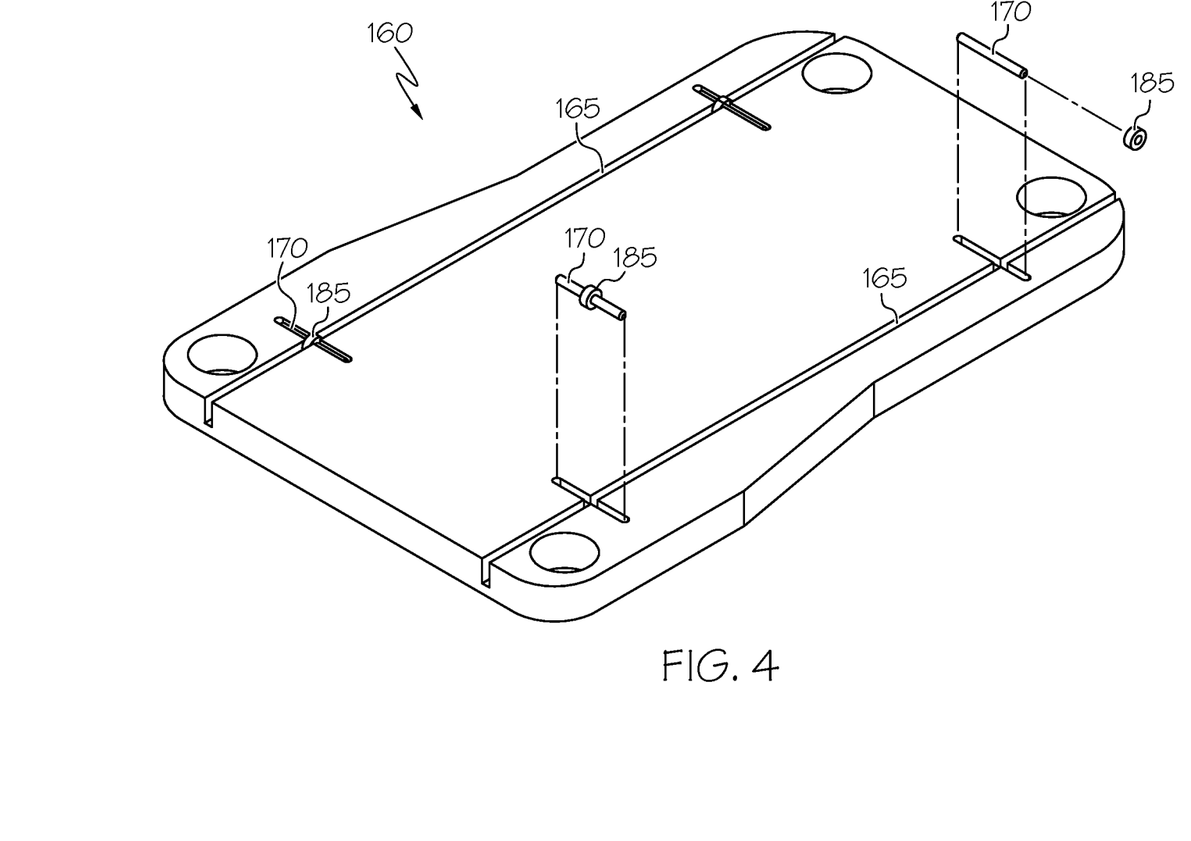
FIG. 4 is a perspective view of the topside of a retractable member.

FIG. 4 illustrates a perspective view of the topside of the retractable member 160. Two grooves 165, each parallel to one another, extend the length of the retractable member 160. Toward each end of each groove 165 at a predetermined located a bar 170 is positioned within the retractable member 160 and placed so that the lengthwise portion of the bar 170 is perpendicular to the lengthwise portion of the groove 165. Secured to the middle of the bar 170 is a nut 185 which is positioned within the groove. 165. When the protruding fingers 150 are being slid in the grooves 165 and come upon the nut 185, the protruding fingers will slide over the nut 185, causing the protruding fingers 150 to push downward on the retractable member 160. The protruding fingers 150, however, cannot move in an upward direction because of the constraints provided by the nodules 115, thus force is applied in a downward direction.

Figure 5:
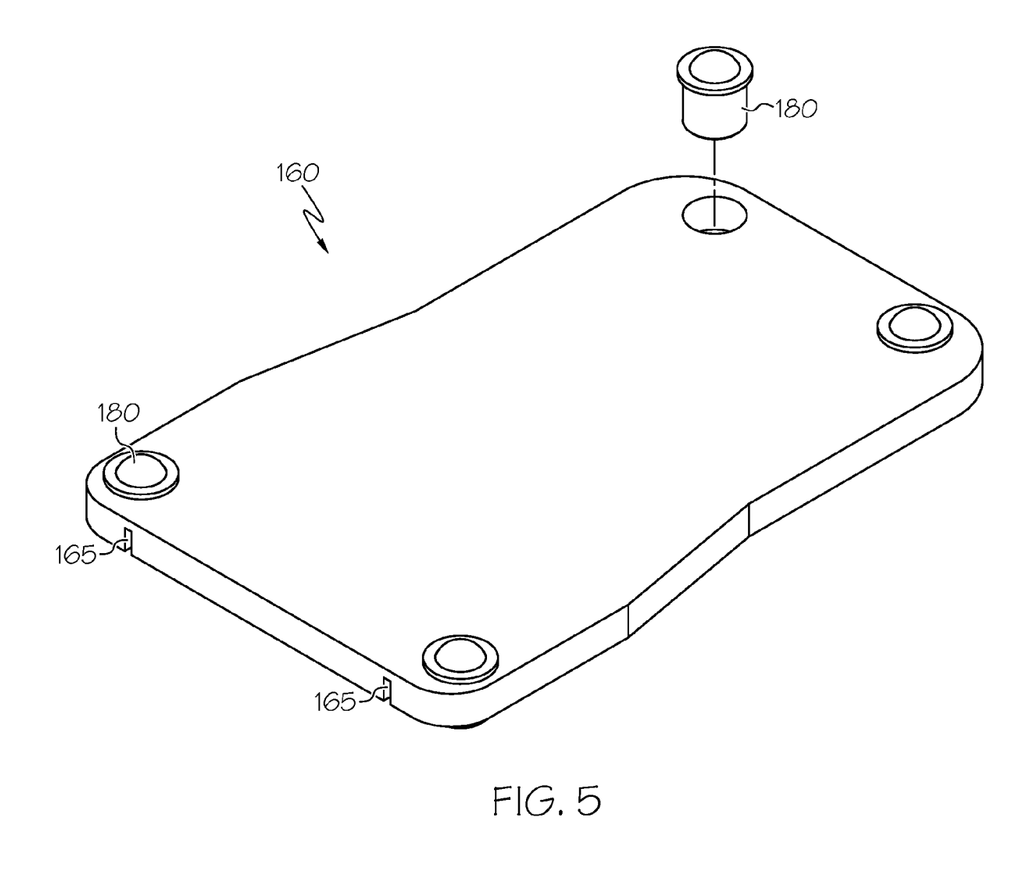
FIG. 5 is a perspective view of the underside of the retractable member.

FIG. 5 illustrate the underside of the retractable member 160. A plurality of transfer balls 180 are attached to the underside of the retractable member 160, one at each corner.

When the transfer balls make contact with a surface, the mixer is then permitted to roll about a surface.

Figure 6:
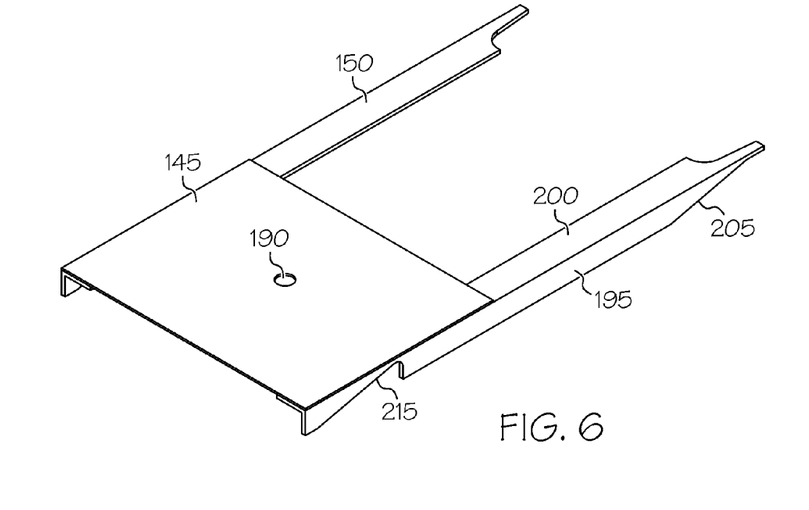
FIG. 6 is a perspective view of the topside of a plate having protruding fingers.
Figure 7:
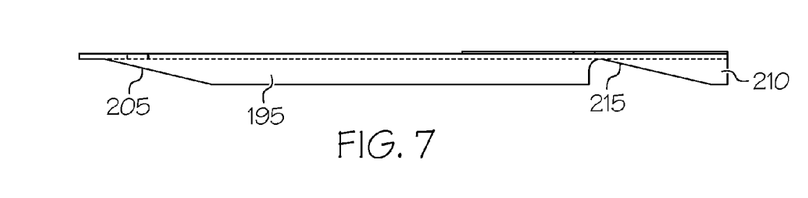
FIG. 7 is a side view of the plate have protruding members.
Figure 8:
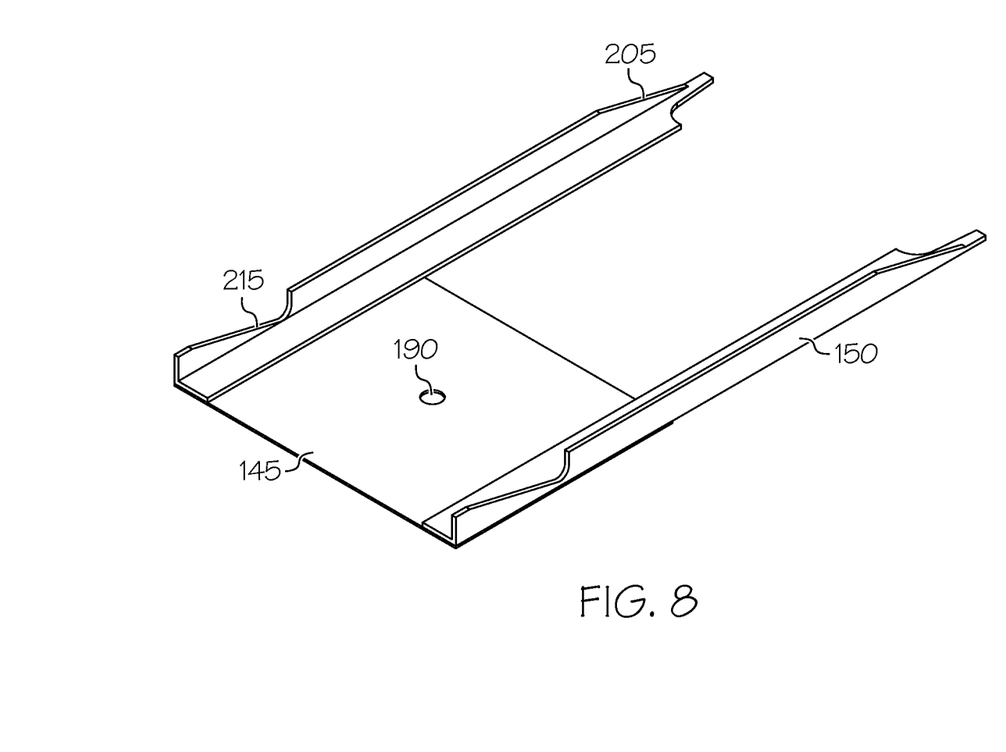
FIG. 8 is a perspective view of the underside of the plate having protruding fingers.

FIGS. 6, 7 and 8 depict differing views of the plate 145 with protruding fingers 150. FIG. 6 depicts a top perspective view. As shown, the plate 145 is rectangle in shape and defines an aperture 190 at its center for mounting the plate 145 to the rod 135 via the prong 155. Each finger 150 comprises a first side 195 and a second side 200. The structure of the first side 195 gradually recedes at one end portion 205 and is indented 215 at the other end portion 210 but which gradually increases from the indention to the other end portion 210. When in use, the second side 200 engages the nodules 115 of the shoulders 110 when the second side 200 slides over the nuts 185 attached to the bars 170 of the retractable member 160. This occurs when the plate 145 slides forward, thus pushing the retractable member 160 in a downward direction. FIG. 7 depicts a side view of the first side 195. The first side 195 fits into the groove 165 of the retractable member 160 and slidably engages therewith. FIG. 8 depicts a perspective view of the underside of the plate 145 and protruding fingers 150.

Figure 9:
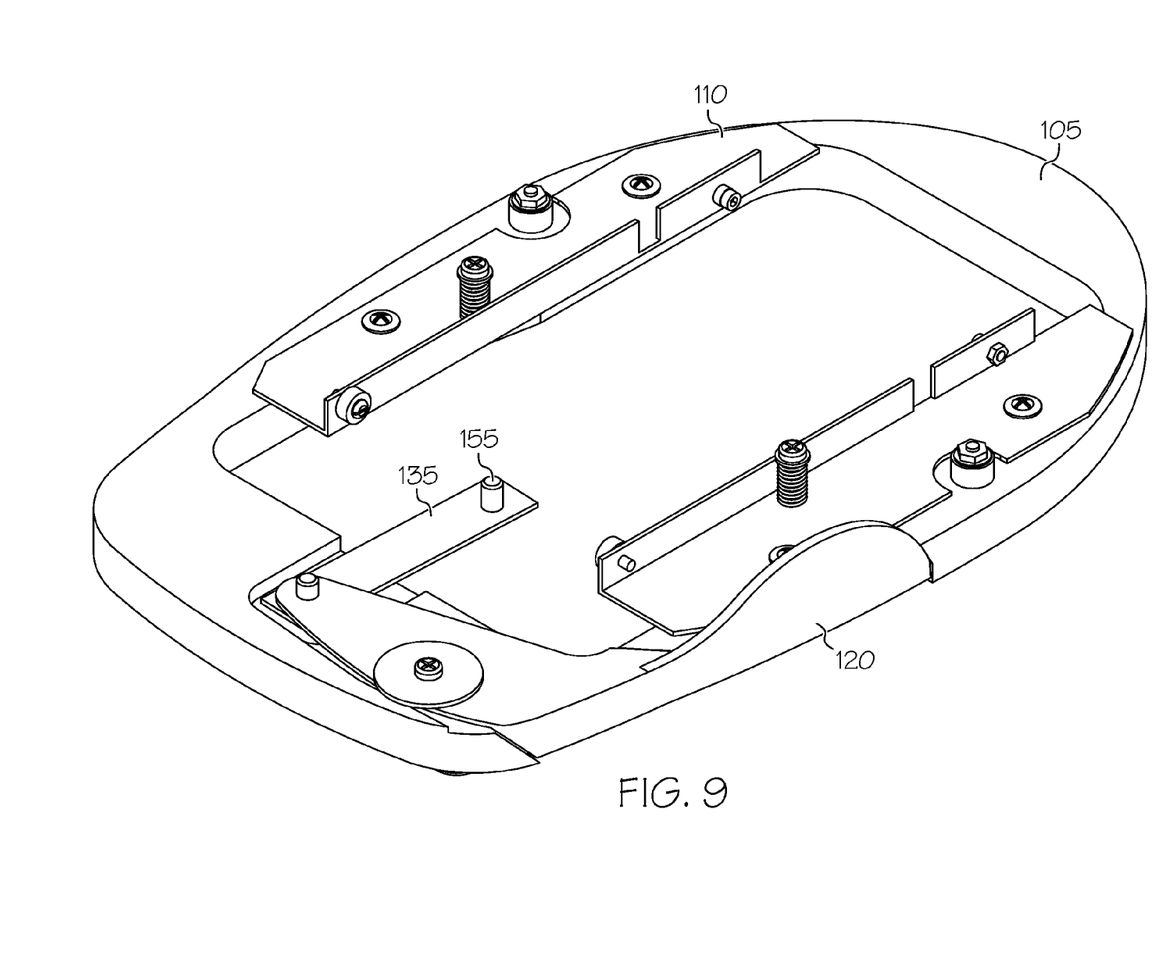
FIG. 9 is a perspective view of the topside of the device of FIG. 1 without a plate and retractable member attached thereto.

FIG. 9 illustrates the topside of an embodiment of the present invention but shown without the plate 145 having protruding fingers 150 or the retractable member 160 attached thereto. As shown, the lever 120 and shoulders 110 attach to the housing 105. The rod 135 pivotally connects to the lever 120 and extends outward. The distal portion of the rod 135 comprises a prong 155 that extends upward.

Figure 10:
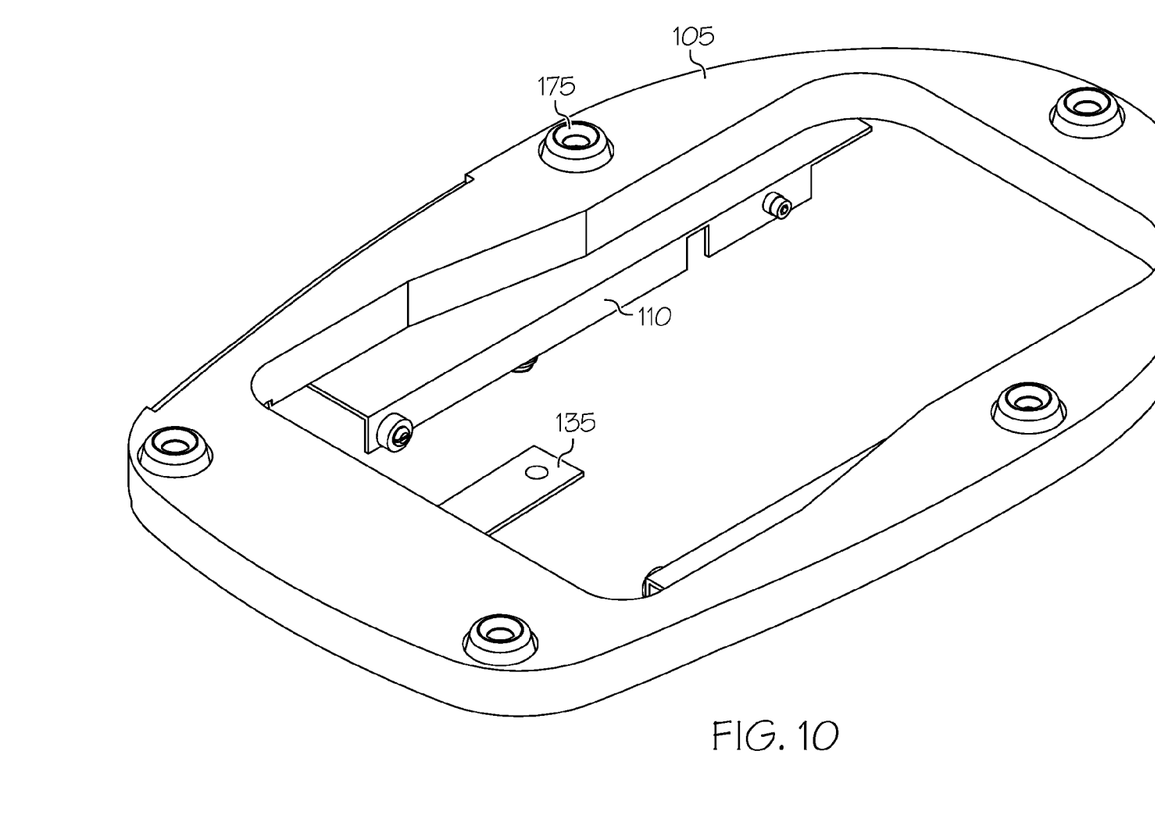
FIG. 10 is a perspective view of the underside of the housing of the device of FIG. 1.

FIG. 10 illustrations the underside of an embodiment of the present invention but shown without either the plate 145 having protruding fingers 150 or the retractable member 160 attached thereto. As shown, feet 175 are attached to the bottom of the housing 105. The feet 175 can be comprised of any material that resists movement such as sliding or rolling. For example, the material of the feet 175 can be comprised of rubber. Therefore, when the retractable member 160 descends, the transfer balls contact the surface, enabling the device to roll about the surface.

Figure 11:
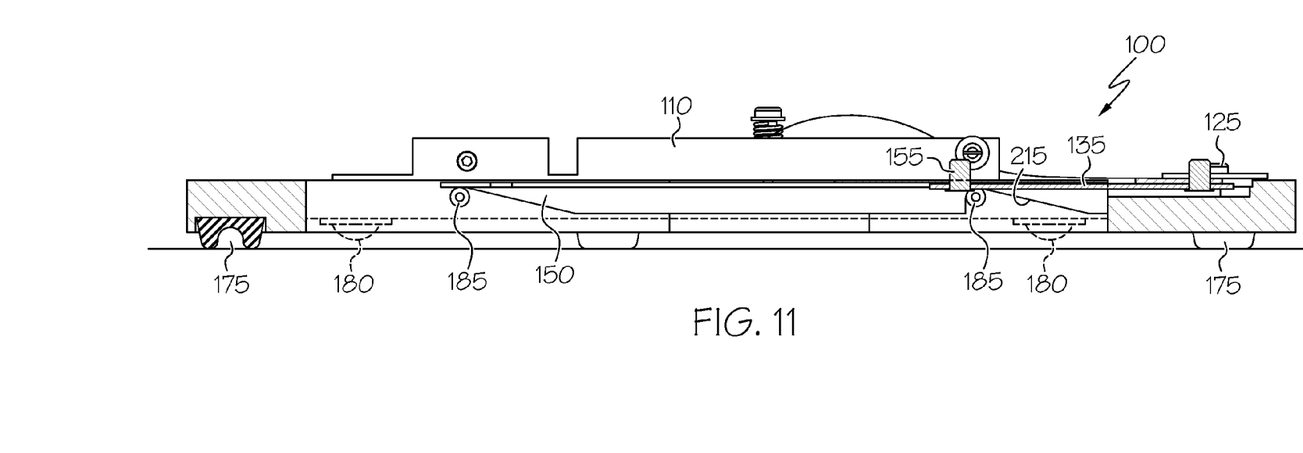
FIG. 11 is a sectional view of the device of FIG. 1 in stationary mode.

FIG. 11 depicts the device 100 in stationary mode. When in a stationary mode, the feet 175 make contact with a surface and the transfer balls 180 are suspended within the device 100, thereby preventing an attached mixer from moving/rolling about the surface. When in this mode, the protruding fingers 150 have not slid over the nuts 185 embedded in the retractable member 160.

Figure 12:
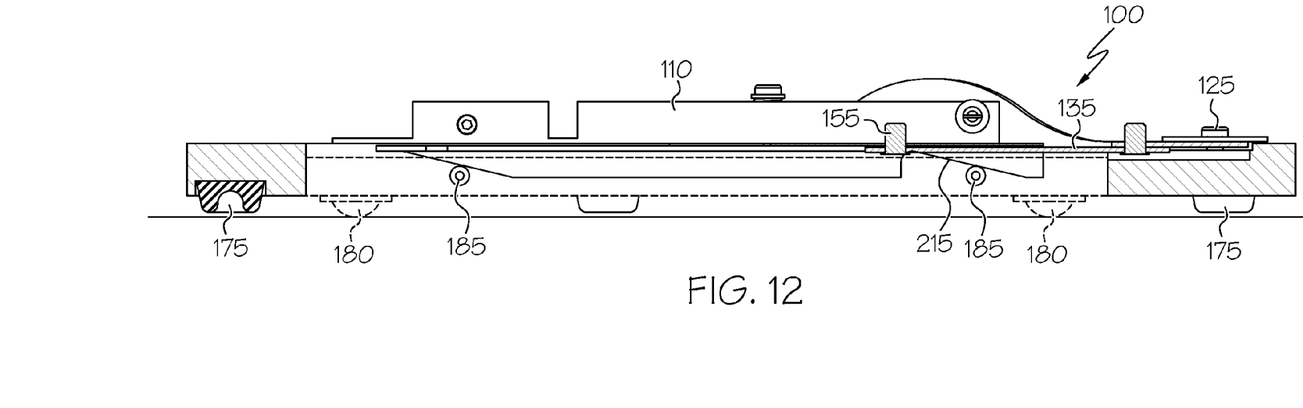
FIG. 12 is a sectional view of the device of FIG. 1 in mobility mode.

FIG. 12, on the other hand, depicts the device 100 in mobility mode, thereby permitting the device 100 to move/roll about a surface. When in mobility mode, the feet 175 are suspend in mid air and do not make contact with the surface, however the transfer balls 180 do make contact with the surface because the retractable member 160 has descended from the device 100. The retractable member 160 descends when the protruding fingers 150 slide forward in the grooves 165 and slide over the nuts 185 embedded within the retractable member 160.

Figure 13:
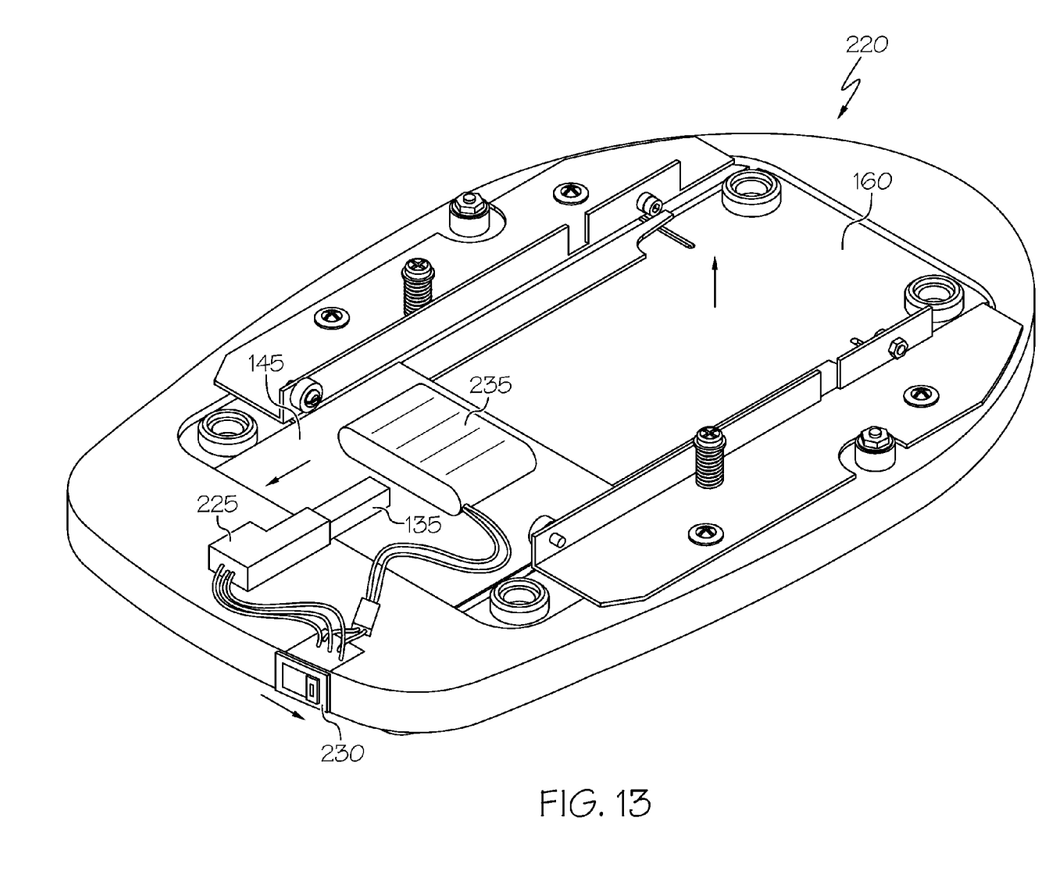
FIG. 13 is a perspective view of the topside of the device for enhancing the mobility of a mixer, comprising an embodiment of the present invention.

FIG. 13 illustrates a device 220 comprising another embodiment of the present invention. In this embodiment, instead of a lever to prompt the device to operate, a switch 230 is used to prompt the device to operate. The switch 230 can be a toggle switch or other type of switch that allows for at least three different modes of operation: a mode that causes the retractable member 160 to descend, thereby permitting the device 220 to move/roll about a surface; a mode that causes the retractable member 160 to ascend, thereby causing the device 220 to become stationary and resist to movement/rolling; and an 'off' mode.

As shown in FIG. 13, the switch 230 connects to an actuator 225 and a power source such as a battery pack 235. The actuator 225 engages a rod 135 and force is applied to the rod 135 to move the rod 135 forward or backward. The switch 230 is located on the exterior of the housing 105 so that it can be manipulated by a user. In FIG. 13, the switch is set to a position which causes the actuator 225 to apply force to the rod 135, force which causes the rod 135 to move backward and the retractable member 160 to retract. As such, the device 220 is shown in a stationary position, resistant to rolling on a surface.

Figure 14:
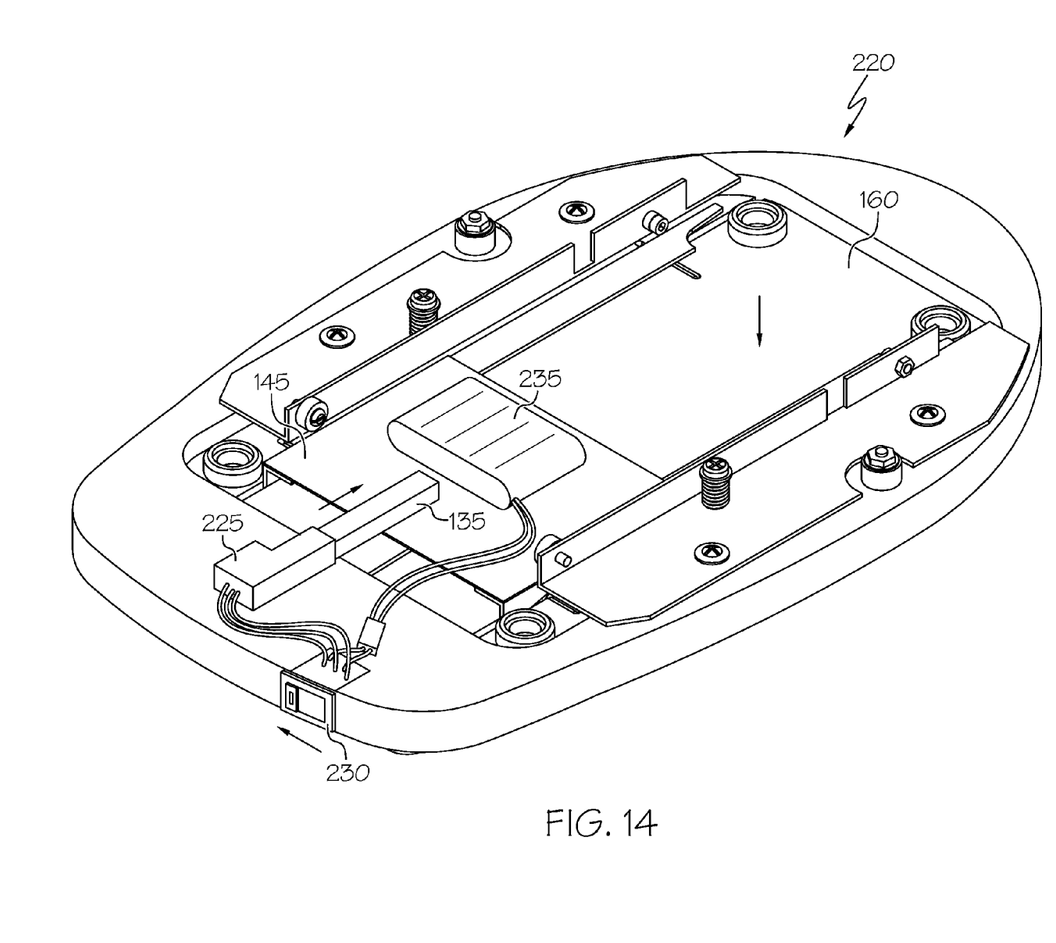
FIG. 14 is a is the perspective view of the device of FIG. 13 depicting the direction of movement of particular component parts.

FIG. 14 depicts the device 220 in a mode that causes the retractable member 160 to descend. When the switch 230 is placed in such a mode, the actuator 225 forces the rod 135 forward, and in turn, forces the retractable member 160 downward as the protruding fingers 150 slide forward in the grooves 165 and over the nuts 185 embedded in the retractable member 160. As the retractable member 160 descends, the transfer balls 180 contact the surface, thereby enabling the device 220 to roll on a surface.

Figure 15:
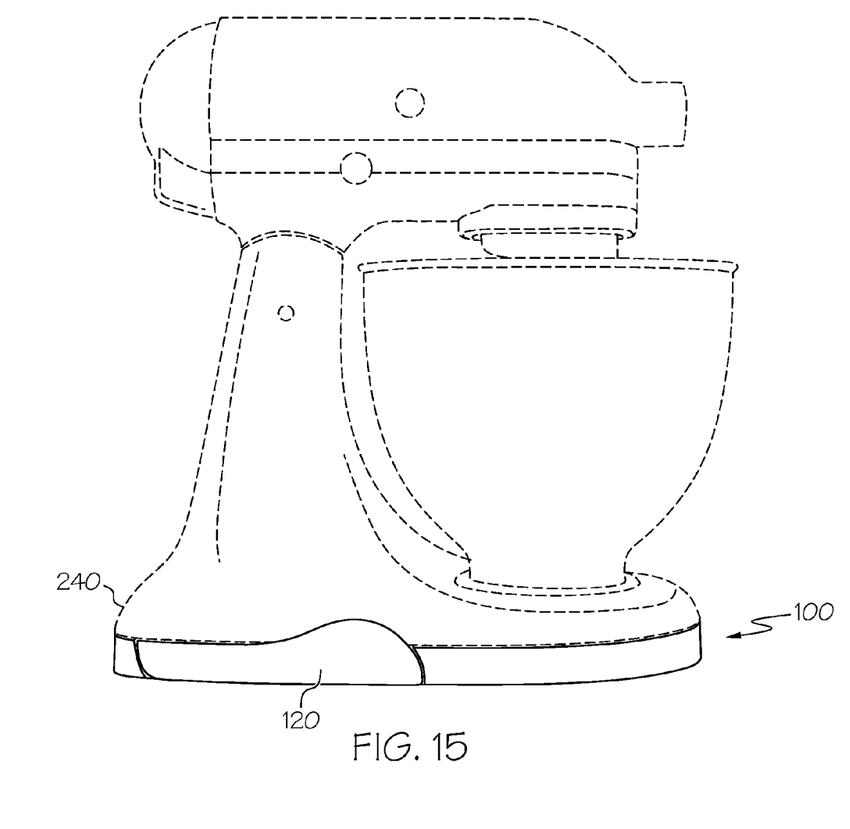
FIG. 15 is a side view of a standard mixer attached to an embodiment of the present invention.

FIG. 15 illustrates the device 100 attached to a standard mixer 240. When the lever 120 is pulled, the mixer 240 can roll on a surface such as a kitchen countertop.

Although many embodiments of the present invention have been illustrated in the accompanying Drawings and described in the foregoing Detailed Description, it should be understood that the present invention is not limited to the embodiments disclosed, but is capable of numerous rearrangements, modifications, and substitutions of parts and elements without departing from the spirit of the invention.

What is claimed is:

1. A device for enhancing the mobility of a standard mixer, the device comprising:
    a housing attached to the underside of the mixer, the housing having at least one shoulder attached thereto, the at least one shoulder having at least one nodule jutting out therefrom;
    a lever pivotally connected to the housing for prompting the device to operate;
    a rod pivotally connected to the lever;
    a plate mounted to the rod, the plate having at least one finger that protrudes therefrom, the at least one finger comprises two sides wherein the structure of the first side gradually recedes at one end portion and is indented for receiving a nodule at the other end portion but which gradually increases at the indention to the other end portion and wherein the structure of the second side is indented at an end portion; and
    a retractable member having at least one transfer ball attached thereto for rolling on a surface, the retractable member slidably engaged to the at least one finger, the retractable member having at least one groove thereon for fitting the at least one finger therein, the at least one groove having at least one bar fitted therein for permitting the first side of the at least one finger to slide over the at least one bar, thereby causing the retractable member to descend.

2. The device of claim 1 wherein the housing is comprised of a plurality of feet that protrudes therefrom.

3. The device of claim 2 wherein the feet are comprised of a rubber material.

4. The device of claim 1 wherein the plate is defined by an aperture.

5. The device of claim 4 wherein the rod is comprised of a prong that protrudes therefrom.

6. The device of claim 5 wherein the prong of the rod fits into the aperture of the plate.

7. A device for enhancing the mobility of a standard mixer, the device comprising:
  a housing attached to the underside of the mixer, the housing having at least one shoulder attached thereto, the at least one shoulder having at least one nodule jutting out therefrom;
  an actuator housed within the housing, the actuator connected to a power source;
  a switch connected to the actuator for prompting the device to operate, the switch positioned on the exterior of the housing;
  a rod connected to the actuator;
  a plate mounted to the rod, the plate having at least one finger that protrudes therefrom, the at least one finger comprises two sides wherein the structure of the first side gradually recedes at one end portion and is indented for receiving a nodule at the other end portion but which gradually increases at the indention to the other end portion and wherein the structure of the second side is indented at an end portion; and
  a retractable member having at least one transfer ball attached thereto for rolling on a surface, the retractable member slidably engaged to the at least one finger, the retractable member having at least one groove thereon for fitting the at least one finger therein, the at least one groove having at least one bar fitted therein for permitting the first side of the at least one finger to slide over the at least one bar, thereby causing the retractable member to descend.

8. The device of claim 7 wherein the housing is comprised of a plurality of feet that protrudes therefrom.

9. The device of claim 8 wherein the feet are comprised of a rubber material.

10. The device of claim 7 wherein the plate is defined by an aperture.

11. The device of claim 7 wherein the rod is comprised of a prong that protrudes therefrom.

12. The device of claim 11 wherein the prong of the rod fits into the aperture of the plate.

* * * * *